United States Patent [19]
Huang

[11] Patent Number: 6,039,103
[45] Date of Patent: Mar. 21, 2000

[54] APPARATUS FOR PRODUCING SHADE MATERIAL

[75] Inventor: Chung-Chen Huang, Taipei, Taiwan

[73] Assignee: Teh Yor Industrial Co., Ltd., Taiwan

[21] Appl. No.: 09/082,692

[22] Filed: May 21, 1998

Related U.S. Application Data

[62] Division of application No. 08/680,987, Jul. 16, 1996, Pat. No. 5,897,730.

[51] Int. Cl.[7] ............................. B32B 31/18; B31D 3/02
[52] U.S. Cl. ............................. 156/511; 156/512
[58] Field of Search .................. 156/197, 263, 156/264, 511, 512, 518, 521

[56] References Cited

U.S. PATENT DOCUMENTS

| | | | |
|---|---|---|---|
| 3,007,698 | 11/1961 | MacDonald et al. | 271/87 |
| 3,477,893 | 11/1969 | Brazener et al. | 156/197 |
| 3,505,151 | 4/1970 | Sheridan | 156/512 |
| 3,660,195 | 5/1972 | Hoyt | 156/197 |
| 4,288,485 | 9/1981 | Suominen | 428/116 |
| 4,388,354 | 6/1983 | Suominen | 428/12 |
| 4,450,027 | 5/1984 | Colson | 156/93 |
| 4,478,886 | 10/1984 | Duggan | 427/210 |
| 4,631,108 | 12/1986 | Colson | 156/461 |
| 4,675,060 | 6/1987 | Schnebly et al. | 156/65 |
| 4,676,855 | 6/1987 | Anderson | 156/193 |
| 4,677,012 | 6/1987 | Anderson | 428/116 |
| 4,732,630 | 3/1988 | Schnebly | 156/64 |
| 4,849,039 | 7/1989 | Colson et al. | 156/197 |
| 4,861,404 | 8/1989 | Neff | 156/204 |
| 4,885,190 | 12/1989 | Schnebly | 427/207.1 |
| 4,943,454 | 7/1990 | Neff | 428/12 |
| 5,002,628 | 3/1991 | Schnebly | 156/379 |
| 5,043,038 | 8/1991 | Colson | 156/193 |
| 5,043,039 | 8/1991 | Swiszcz | 156/197 |
| 5,090,098 | 2/1992 | Seveik et al. | 29/24.5 |
| 5,094,705 | 3/1992 | Anderson | 156/184 |
| 5,097,692 | 3/1992 | Brugman | 72/170 |
| 5,104,469 | 4/1992 | Colson | 156/197 |
| 5,193,601 | 3/1993 | Corey et al. | 160/84.1 |
| 5,205,891 | 4/1993 | Neff | 156/204 |
| 5,228,936 | 7/1993 | Goodhue | 156/260 |
| 5,308,435 | 5/1994 | Ruggles et al. | 156/465 |
| 5,364,485 | 11/1994 | Miura et al. | 156/264 |
| 5,405,483 | 4/1995 | Neff | 156/379.8 |
| 5,413,658 | 5/1995 | Ruggles et al. | 156/204 |
| 5,441,592 | 8/1995 | Ruggles et al. | 156/563 |

OTHER PUBLICATIONS

Japio Abstract, M. Section No. 529, vol. 10, No. 315, p. 118, Oct. 25, 1986.

*Primary Examiner*—Michael W. Ball
*Assistant Examiner*—Barbara Musser
*Attorney, Agent, or Firm*—Olson & Hierl, Ltd.

[57] ABSTRACT

A method and apparatus for producing an expandable material from a strip material by longitudinally reciprocating a carriage on a frame between first and second rolls containing supplies of the strip material. The carriage is alternately engageable with the strip material of a first supply roll and the strip material of a second supply roll. The carriage includes an adhesive application device that applies an adhesive to a top surface of a stack of sheets of strip material positioned between the first and second supply rolls using the adhesive application device by moving the carriage. The strip material is then pressed and stacked by a press and stacking device that are driven by cams.

26 Claims, 6 Drawing Sheets

APPARATUS FOR PRODUCING SHADE MATERIAL

This is a division of application Ser. No. 08/680,987, filed on Jul. 16, 1996 now U.S. Pat. No. 5,897,730.

TECHNICAL FIELD OF THE INVENTION

This invention relates to a method and apparatus for manufacturing a material used to make window shades and the like.

BACKGROUND OF THE INVENTION

The use of expandable materials in window shades and other devices is becoming increasing popular. One explanation may be that the public is becoming increasingly knowledgeable of the need for energy conservation and the savings and environmental benefits that result from energy conservation. Expandable material offers significant insulative and energy conservation benefits. The popularity of expandable materials is not limited, however, to energy conservation applications because expandable material has become very popular as substitutes for more established window treatments. Thus, expandable material provides both energy conservation and aesthetic benefits.

Due to the growth in popularity of expandable material, a need has developed for more efficient and cost-effective methods of manufacturing effective and aesthetically-pleasing expandable material. Most of the prior art methods and devices for producing expandable material are often complicated or not capable of producing a continuous expandable material that is not deformed or deviated.

Accordingly, what is needed is a method and apparatus for readily and easily fabricating expandable material that is long lasting and has an attractive appearance without wrinkles or warp. The method and apparatus should be capable of producing expandable material of continuous length without significant deformations or deviations. The method and apparatus should be capable of rapidly producing expandable material, and should be relatively inexpensive. The present invention meets these desires.

SUMMARY OF THE INVENTION

The present invention relates to a method and apparatus for making expandable material. In a method embodiment of the invention, the expandable material is produced from a laminate or strip material by moving a carriage relative to a supply of strip material which is preferably first and second rolls containing the strip material. The carriage is preferably slidably mounted to the frame, and is alternately engageable with the strip material of the first roll and the strip material of the second roll. Alternatively, the carriage can be fixed or the supply moved. Also provided is an adhesive application device.

In a preferred embodiment, the method includes engaging the carriage with the strip material of the first roll. Next, a first sheet of the strip material is drawn from the first roll by moving the carriage in a first direction. The first sheet is then pressed within a stacking device or on a support after the carriage moves in the first direction to begin a stack of sheets. The first sheet is cut to a desired length.

The carriage then preferably engages the strip material of the second roll, and moves in a second or reverse direction to draw a second sheet of the strip material. Adhesive is preferability applied to a top surface of the stack as the carriage moves in the second direction by the adhesive application device which is preferably mounted over carriage. Next, the second sheet is pressed onto the top surface of the stack after the carriage travels in the second direction to add the second sheet to the stack. The second sheet is cut to the desired length.

The carriage then again engages the strip material of the first roll, and moves in the first direction to draw a third sheet of the strip material. As the carriage moves in the first direction, adhesive is applied to the top surface of the stack. Next, the third sheet is pressed onto the stack to add the third sheet to the stack. The third sheet is cut to the desired length.

The above-described steps are repeated a predetermined number of times to produce the expandable material.

The carriage may include a switch adapted to cause engagement and disengagement of the strips of material and to cause the carriage to reverse direction. Desirably, the switch is actuated each time the carriage completes travel in the first or second direction.

In a preferred embodiment, the method is performed by an apparatus operably connected to the first and second rolls. The apparatus includes the frame and the carriage with the adhesive application device preferably mounted on the carriage. Alternatively, the adhesive application device can be separately mounted for movement relative to the stack. The apparatus also includes the press and the stacking device for pressing and stacking sheets of strip material successively drawn from the first and second strip materials. The press and stacking devices are slidably mounted on the frame, and may be driven by cams or cylinders.

Desirably, the strip material of the first and second rolls is a laminate configured to have a cross section that may be described generally as being in the form of the numeral "8". In a preferred embodiment, the folding and configuring of the strip material is accomplished as follows. A roll of elongated strip material having two flat surfaces and two lateral ends extending along the length of the strip material is provided. The strip material is drawn from the roll and fed through crimpers. The crimped material is then fed through a folding mechanism where one lateral end of the material is folded over onto one flat surface and the other lateral end of the strip material is folded over onto the other flat surface. The folded material is then heated by a heating roll to form permanent folds.

An adhesive is then applied to the folded material to adhere one lateral edge of the folded material to the one flat surface. The folded material is then rotated 180 degrees by a wheel or the like, and adhesive is applied to the folded material to adhere the other lateral edge to the other flat surface. The folded and configured material is then wound onto a supply roll which can then be operably connected to the apparatus and used to perform the method described above.

The present invention provides a method and apparatus for readily and easily fabricating expandable material that is long lasting and has an attractive appearance without wrinkles or warp. The method and apparatus are capable of producing expandable material of continuous length without significant deformations or deviations. The method and apparatus are capable of producing expandable material rapidly and relatively inexpensively.

Numerous other features and advantages of the present invention will become readily apparent from the detailed description of the invention, the accompanying drawings and the appended claims.

DETAILED DESCRIPTION OF THE PREFERRED EMBODIMENTS

FIGS. 1–6 provide an example of a preferred embodiment of an apparatus 10 used for carrying out the invention. The apparatus 10 includes a frame 12, and a carriage 14 which is preferably slidably mounted to the frame so that it can move or reciprocate in a longitudinal direction with respect to the frame. A press 16 preferably is slidably mounted to the frame so that it can reciprocate in the vertical direction generally perpendicularly to the movement of the carriage 14. A stacking device 18 preferably is also slidably mounted to the frame so that it can also reciprocate in the vertical direction. It is preferred that the press 16 and the stacking device 18 reciprocate with respect to each other and the frame 12.

In embodiment of FIGS. 1–6, the frame 12 includes a beam 24, and a pair of support rods 26 extending generally perpendicular to the beam and interconnected by the beam. The beam 24 includes a front face 30 that defines channels 32, 34 on the opposed lateral ends of the front face for slidably mounting to the frame 12 the carriage 14 and a pair of mounting plates 40, as described below. The channels 32, 34 preferably have a rectangular cross section and extend along the length of the beam 24.

The carriage 14 is adapted to reciprocate on the beam 24 preferably between a first pair of rollers 42 and a second pair of rollers 44. A supply of a strip material 46 is provided, which preferably is in the form of first and second supplies or supply rolls 50, 52, that are positioned to feed the strip material through the respective first and second pairs of rollers 42, 44. As the carriage 14 reciprocates, it alternately engages the strip material 46 from one of the supply rolls 50, 52 and disengages the strip material from the other supply roll to form within the stacking device 18 a stack 58 of sheets of the strip material 46, as described below. In an alternative embodiment, the carriage 14 may draw the strip material from a single supply or supply roll only when the carriage travels in one direction.

In the embodiment of FIGS. 1–6, each pair of rollers 42, 44 is rotatably mounted to a respective mounting plate 40 by a pair of fasteners 48. The mounting plates 40 are slidably mounted to the beam 24 in any suitable manner, such as by a lip 56 which is received within the channel 32 defined by the beam so that the mounting plates can slide or reciprocate in the longitudinal direction. In the embodiment of FIGS. 1–6, a cutting edge 110 is slidably mounted to each mounting plate to permit vertical movement of the cutting edge for cutting the strip material during the pressing as hereinafter described.

Figure 1:
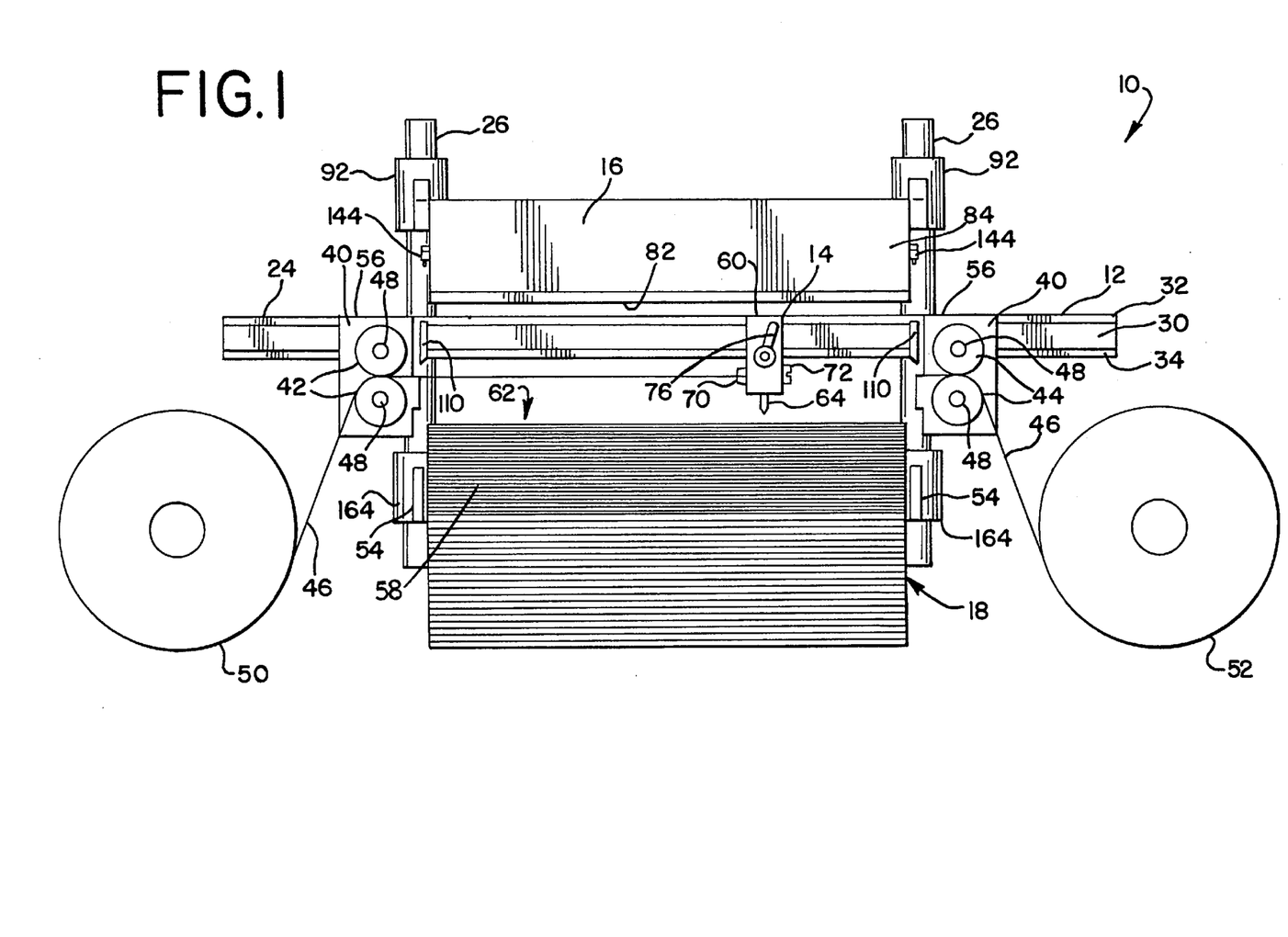
FIG. 1 is an elevational view, schematic in nature, of an apparatus for producing an expandable material from strips of laminate material in accordance with a preferred embodiment of the invention.
Figure 2:
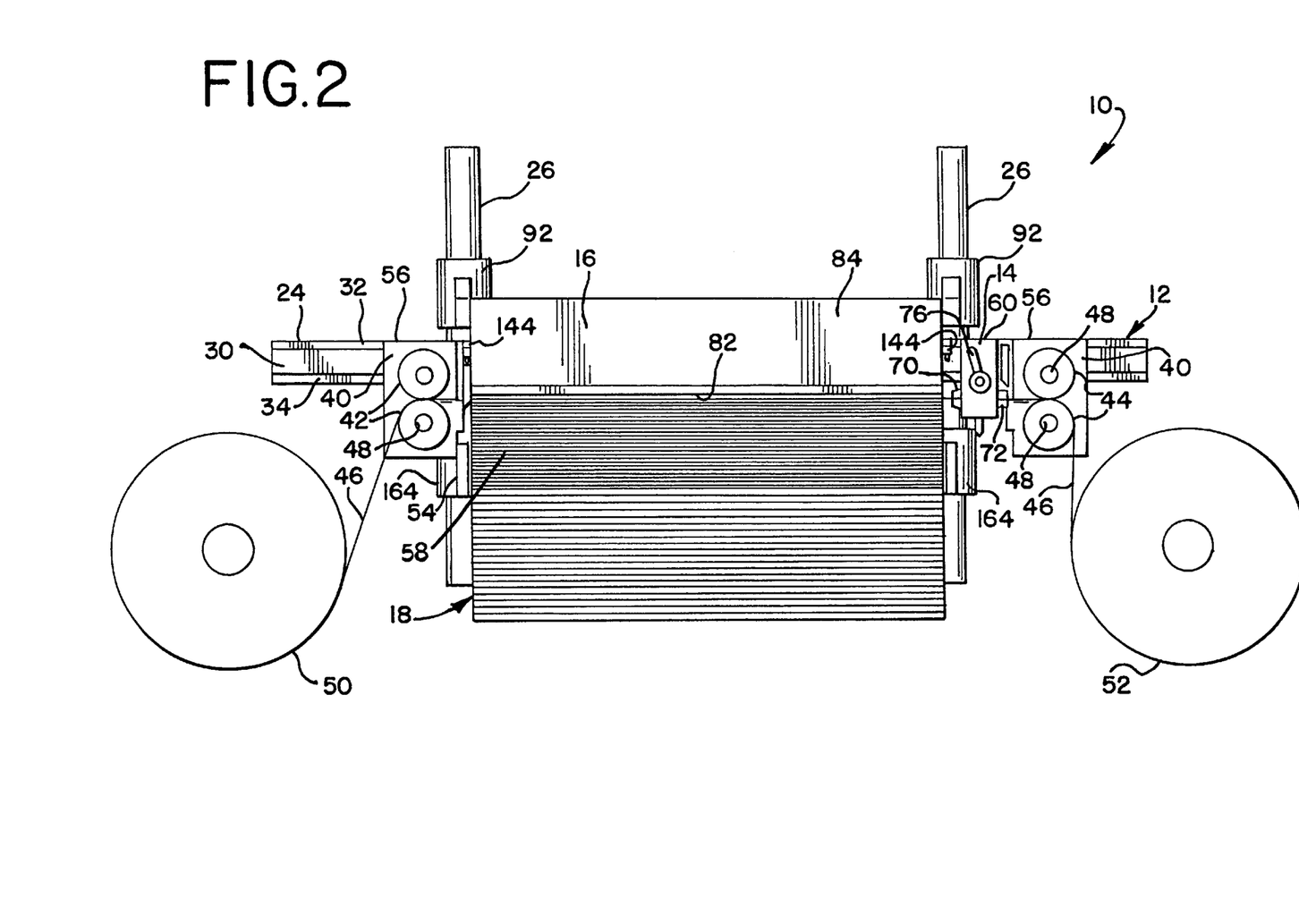
FIG. 2 is an elevational view illustrating the apparatus of FIG. 1 after a reciprocating carriage has traveled in a longitudinal direction.
Figure 3:
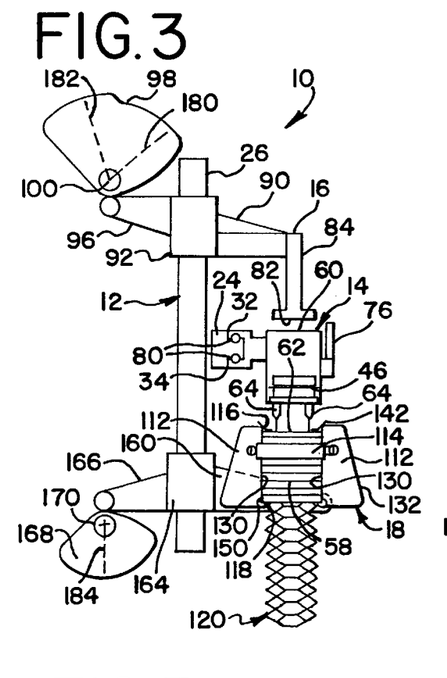
FIGS. 3–6 are schematic end views of the apparatus of FIG. 1 illustrating successive steps of a method for producing the expandable material in accordance with a preferred embodiment of the invention (with the mounting plates of the apparatus removed to show the details of the pressing and stacking of the strip material)
Figure 4:
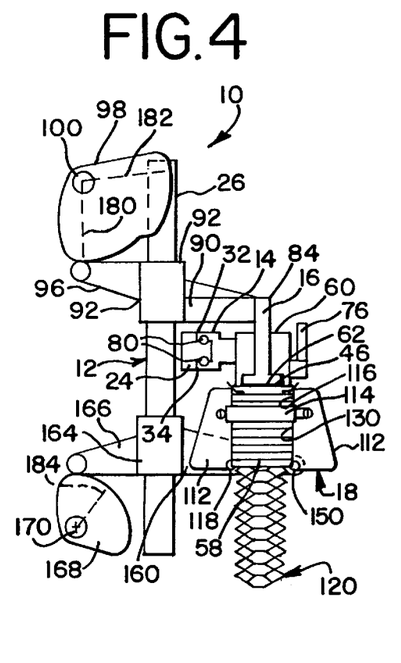
Figures 5, 6:
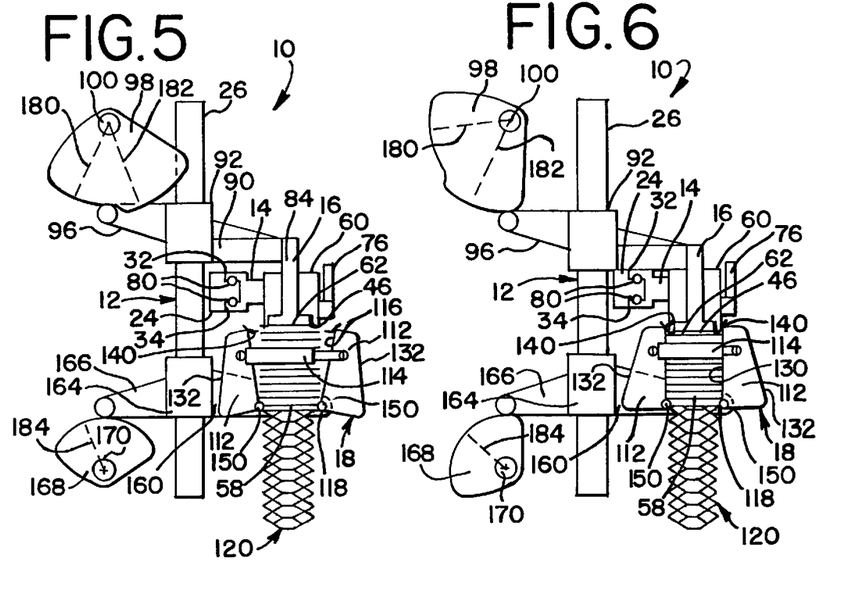

As illustrated in FIG. 2, as the carriage 14 completes movement in one direction, it travels away from the stack 58 to permit the press 16 and the stacking device 18 to move toward each other, and, as the carriage completes travel, an adjacent mounting plate 40 on the beam 24 also moves away from the stack. After the press 16 and stacking device 18 move toward each other and pressing is completed, the press 16 and the stacking device 18 move away from each other, and the carriage 14 preferably engages the strip material 46 of the other supply roll (e.g., in FIG. 2, the second supply roll 52) and reverses direction. As the carriage 14 moves in the reverse direction, the same mounting plate 40 moves along the beam 24 in the reverse direction and stops adjacent one of the longitudinal ends 54 of the stacking device 18. The carriage then continues travel in the reverse direction, traveling beyond the other longitudinal end of the stack 58 with the other mounting plate 40 moving away from the other longitudinal end of the stack.

The back and forth movement of the respective mounting plates may be achieved in any suitable manner. For example, a pair of cylinders or solenoids may be included to move the respective mounting plates back and forth. Each cylinder or solenoid pushes the respective mounting plate toward the respective longitudinal end 54 of the stacking device 18 as the carriage 14 is moving away from that cylinder, and later pulls the respective mounting plate away from the respective longitudinal end after the carriage has reversed direction and as it completes travel in the reverse direction. The mounting plates 40 may be repeatedly stopped adjacent the stack by a sensor, by a stepping motor controlled by programmable logic controller, or by any other suitable means. The pair of cylinders or solenoids may be joined together, or, instead, a single cylinder or solenoid can be used to cause both of the mounting plates to move back and forth during operation. Also, the carriage 14 may be capable of causing the movement of the mounting plates 40 by contacting and pushing the respective mounting plate away from the respective longitudinal end 54 and by later pulling the strip material in a direction away from the respective mounting plate which may pull the mounting plate toward the respective longitudinal end.

An adhesive application device 60 may be included that is adapted to apply adhesive to a top surface 62 of the stack 58 as the carriage 14 travels between the press 16 and the stacking device 18. Preferably, the adhesive application device is mounted on the carriage 14 and includes a pair of dispensing nozzles 64 that are spaced laterally relative to the frame 12, and applies two strips of adhesive to the top surface 62 of the stack 58 as new sheets are added to the stack.

A pair of clamps 70, 72 are included on opposite sides of the carriage 14. The clamp 70 faces the first pair of rollers 42 and is adapted to engage the strip material 46 from the first supply roll 50, and disengage the strip material after the carriage 14 has traveled in one direction. The clamp 72 faces the second pair of rollers 44 and is adapted to engage the strip material 46 from the second supply roll 52, and disengage the strip material after the carriage 14 has traveled in a reverse direction.

A three-function, two-position switch 76 may be provided on the front of the carriage 14 that is actuated as the carriage 14 completes travel in each direction. Actuation of the switch causes the carriage 14 to reverse direction, causes one of the clamps 70, 72 to disengage the strip material 46 from one of the supply rolls 50, 52, and causes the other clamp to engage strip material 46 from the other supply roll. The switch 76 may be included on the front of the carriage 14, and may be actuatable in any suitable manner. For example, a pair of toggle switches (not shown) or other suitable structure may be included on the frame 12 or the mounting plates 40 for causing actuation of the switch 76 as the carriage 14 completes travel in each direction.

The carriage 14 is slidably mounted to the frame 12 in any suitable manner. In the illustrated embodiment, for example, the carriage 14 is mounted to the first beam 24 by a pair of roller wheels 80 that are rotatably mounted to the carriage 14 and are adapted to be received within the channels 32, 34 defined on the front face 30 of the first beam 24.

In the illustrated embodiment, the press 16 has an inverted T-shaped cross section substantially along its length. The press 16 defines a flat bottom surface 82 to press the individual sheets drawn from the strips of material 46 as discussed in detail below, and a vertical portion 84 of the press.

The press 16 is secured to the frame 12 in a manner that permits up and down movement of the press relative to the frame 12. In the illustrated embodiment, the press 16 includes a first mounting arm 90 rigidly mounted to the vertical portion 84 along the length of the press 16. The first mounting arm 90 includes a pair of first collars 92 at opposed longitudinal ends of the mounting arm which are adapted to slidably receive one of the support rods 26. A first cam follower 96 extends from each first collar 92 that is in operable engagement with a pair of first cams 98. The first cams 98, which are joined together by a coupling bar 100, are adapted to effect reciprocating motion of the press 16. In accordance with alternative embodiments, the press 16 may be driven by other suitable means, such as by cylinders that are controlled by a programmable logic controller.

The longitudinal ends of the press 16 include a pair of projections 144, which, in the illustrated embodiment, are in the form of stanchions adjustably mounted to the press. The projections 144 are adapted to engage the cutting edges 110 on the mounting plates 40 and slide the cutting edges 110 downward to cut the strip material during the pressing of the material so that each sheet pressed into the stacking device 18 has a length that substantially corresponds to a length of the stack. Since the mounting plates reciprocate in the manner described above, the projections 144 alternately engage respective cutting edges 110 so that the cutting edge 110 that is positioned farthest from the carriage during the pressing step moves downward. The cutting edges 110 preferably are biased upward by a spring or the like so that the cutting edges return to its upward position after the press returns to its elevated position.

Figure 7:
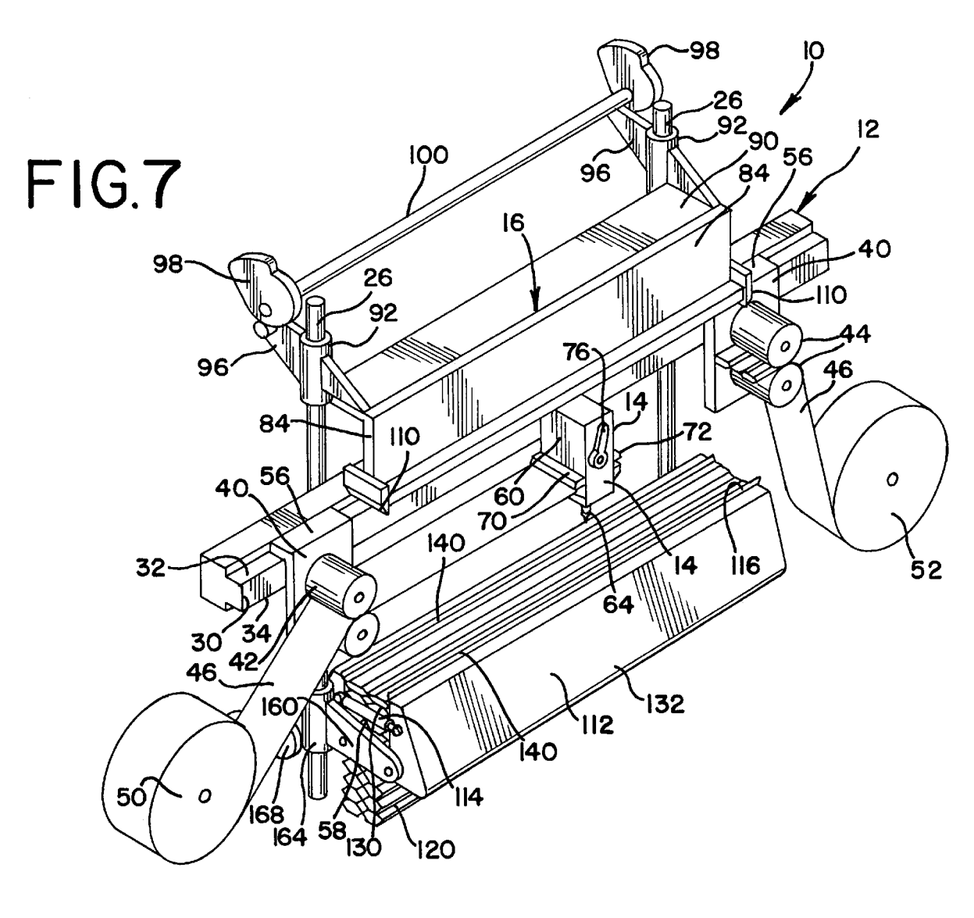
FIG. 7 is a perspective view of an apparatus for producing the expandable material in accordance with an alternative embodiment.

In an alternative embodiment of the invention illustrated in FIG. 7, the cutting edges 110 are rigidly mounted to the press 16. With this embodiment, both cutting edges move with the press 16 during each pressing step.

The stacking device 18 in accordance with the embodiments of FIGS. 1–7 includes a pair of blocks 112 extending substantially the same length as the stack 58, and a pair of extendible arms 114 joining together the ends of the blocks. The stacking device 18 defines a first opening 116 for receiving the sheets of material and a second opening 118 for releasing portions of an expandable material 120 after a predetermined amount of stacked sheets is contained within the stacking device 18. The first opening 116 is adapted to expand as successive sheets of a strip material are pressed onto the stack, and contract after the successive sheets are pressed onto the stack.

The blocks 112 define a pair of inwardly-facing walls 130 and a pair of outwardly-facing walls 132. The inwardly-facing walls 130 are generally parallel when the first opening 116 is contracted, and the outwardly-facing walls 132 are generally parallel when the first opening is expanded. Inwardly-extending spacers 140 may be included on the inwardly-facing walls 130 adjacent the first opening 116 for causing the opposed lateral edges of each individual sheet of strip material to fold or bend slightly upward as it is pressed onto the stack. This upward bending of the lateral edges of each individual sheet minimizes any adherence between the lateral edges of successive sheets and, thus, facilitates the production of the design of the expandable material 120. If desired, a pair of guiding flanges 142 may also extend upward from the spacers 140, at a slight outward angle, for guiding the material into the stacking device 18. The extendible arms 114 may be defined by a pair of telescopically-connected rods.

The stacking device 18 is adapted to move up when the press 16 moves downward, and the blocks 112 are adapted to pivot outward as the press 16 presses individual sheets onto the top surface 62 of the stack 58 to permit the flat surface 82 of the press 16 to be received within the stacking device 18. The blocks 112 pivot inward after the press 16 is moved away from the stacking device 18.

The stacking device 18 also may include a pair of protuberances or bosses 150 extending from the inwardly-facing walls 130 adjacent the second opening 118 preferably along the length of each block. The bosses 150 are adapted to retain the stack 58 within the stacking device 18 until the stacking device 18 is filled with expandable material 120, and to release a bottom most layer of expandable material after the stacking device is filled with expandable material.

The stacking device 18 also is secured to the frame 12 in a manner that preferably permits reciprocating movement of the stacking device 18 and expanding and contracting of the first opening 116. In the illustrated embodiment, the stacking device 18 includes a pair of second mounting arms 160 rigidly mounted to the blocks by fasteners. Each second mounting arm 160 is secured to a movable second collar 164 slidably received on the support rods 26. The second collars 164 are secured to a pair of second cam followers 166 which are in operable engagement with a pair of second cams 168. The second cams 168 are joined together by a second coupling bar 170. In accordance with alternative embodiments, the stacking device 18 may be driven by other suitable means, such as by cylinders that are controlled by a programmable logic controller.

In accordance with one embodiment of the invention, the pressing of individual sheets onto the stack 58 can be accomplished as follows. The press 16 and stacking device 18 move toward each other until the press 16 contacts the top surface 62 of the stack 58, at which point the blocks 112 pivot to expand the first opening 116. Next, the press 16 moves a further distance toward the stack and is received within the stacking device 18 and presses the individual sheet onto the stack 58. Thus, during the pressing, the press 16 moves two intervals of distance.

In a preferred embodiment, the first and second cams 98, 168 are configured to accomplish pressing in this manner.

Thus, each of the first cams 98 has a first radius 180 which causes the press 16 to move the first interval of distance and a second radius 182 to cause the press 16 to move the second interval of distance. A third radius of each first cam 98 positions the press 16 away from the stacking device 18. Each second cam 168 includes a first radius 184 for causing the stacking device 18 to move toward the press 16, and a second radius for causing the stacking device 18 to move in an opposite direction.

In a preferred embodiment, expandable material 120 can be fabricated by the apparatus 10 by a method that includes the step of engaging the carriage 14 with the strip material of the first supply roll 50. A first sheet is drawn from the first roll by moving the carriage in a first direction. The first sheet is then pressed within the stacking device 18 to begin the stack 58 after the carriage moves in the first direction. The first sheet is cut to a desired length by the cutting edge 110 positioned farthest from the carriage 14.

The carriage 14 then engages the second roll 52, and moves in a second or reverse direction to draw a second sheet. Adhesive is applied to the top surface 62 of the stack 58 as the carriage moves in the second direction. Next, the second sheet is pressed onto the top surface of the stack after the carriage travels in the second direction. The second sheet is cut to the desired length by the other cutting edge 110.

The carriage 14 then engages the first supply roll 50, and moves again in the first direction to draw a third sheet of the strip material from the first supply roll. As the carriage moves in the first direction, adhesive is applied to the top surface of the stack. Next, the third sheet is pressed onto the stack after the carriage travels in the first direction, and is cut to the desired length by one of the cutting edge.

The above-described steps may be repeated a predetermined number of times to produce the expandable material.

Preferably, during the pressing step, the press 16 moves towards the stack 58 and the stacking device 18 moves towards the press 16. Additionally, the first opening 116 expands to receive the bottom of the press 16 during the pressing steps, and contracts after the pressing steps. Expandable material 120 contained within the stacking device 18 may then be discharged or released from the stacking device 18 through the second opening 118 after a predetermined amount of expandable material is contained within the stacking device 18.

The strip material 46 contained on the first and second supply rolls 50, 52 preferably is a laminate having a cross section that includes a pair of loops such as the configuration of FIGS. 3–6 or the numeral "8" configuration of FIG. 7. Prior to lamination, the strip material 46 is elongated and has two flat surfaces and a pair of lateral ends extending along the length of the material. One lateral end of the strip material 46 is folded over and adhered to one of the flat surfaces, and the other lateral end is folded over and adhered to the other flat surface to form the laminate material that may be used with the apparatus 10 described above.

Figure 8:
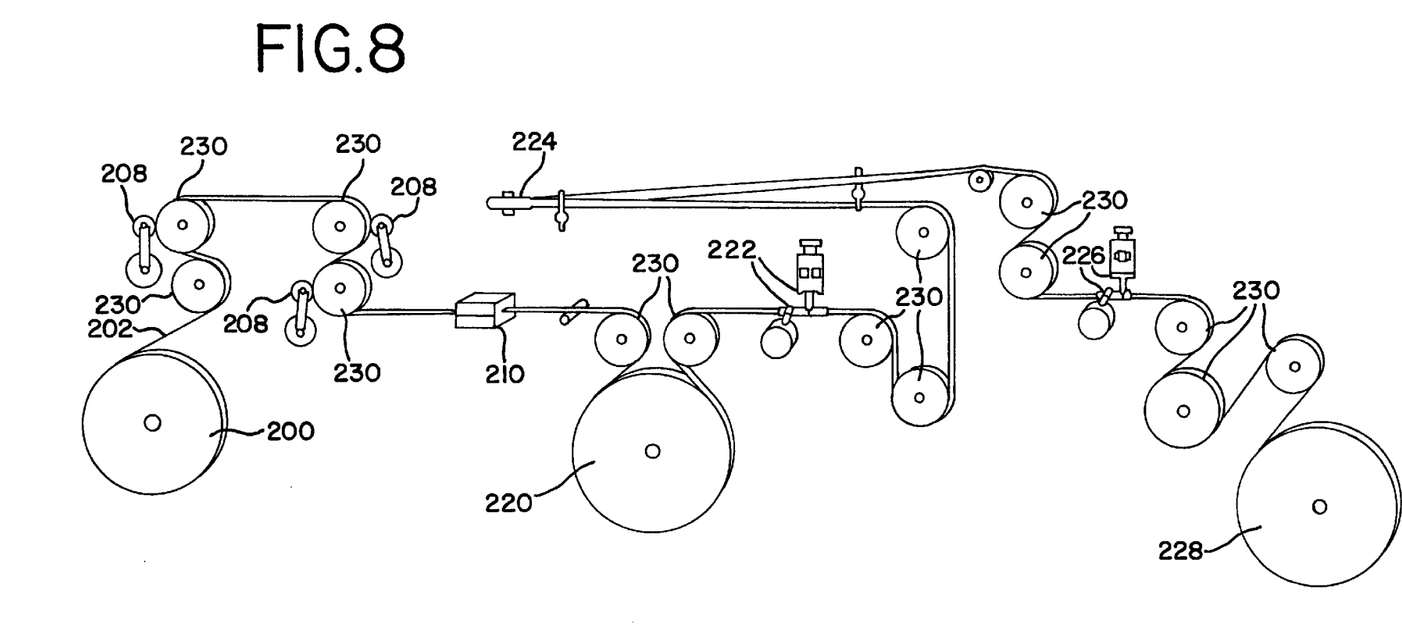
FIG. 8 is a schematic of an apparatus and method for producing the laminate material to be used with the apparatus and method of FIGS. 1–6 and FIG. 7 in accordance with a preferred embodiment of the invention.
Figure 9:
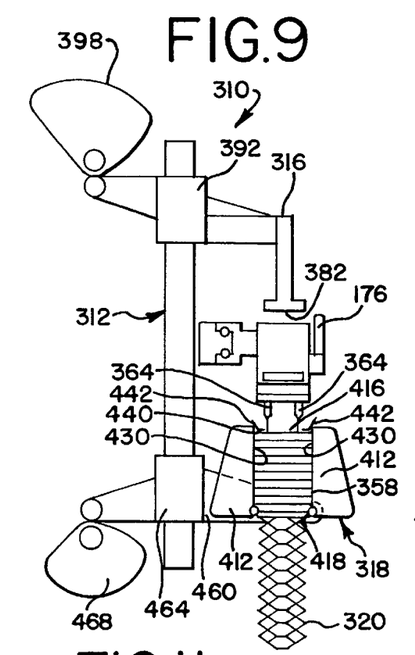
FIGS. 9–12 are schematic end views of an apparatus for producing an expandable material from strips of laminate material in accordance with an alternative embodiment of the invention, illustrating successive steps of an alternative method for producing the expandable material (with the mounting plates of the apparatus removed to show the details of the pressing and stacking of the strip material).
Figure 10:
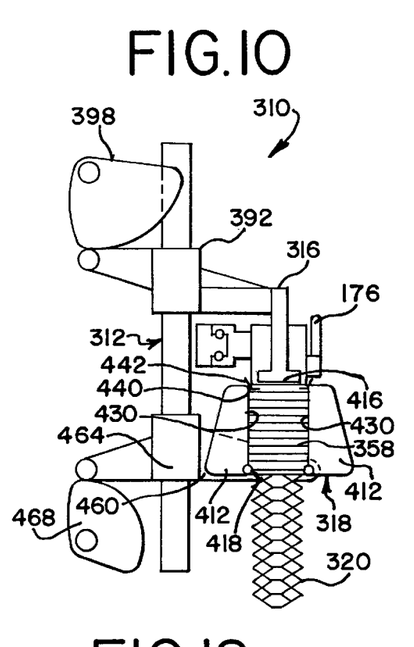
Figure 11:
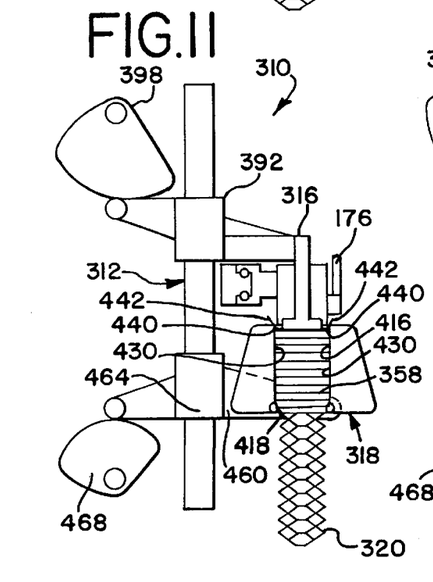
Figure 12:
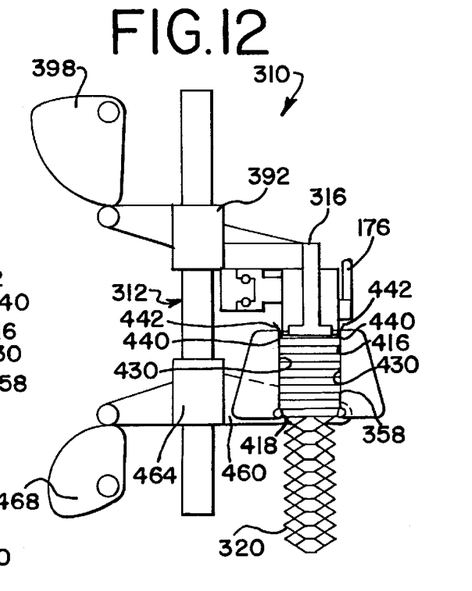

As illustrated in FIG. 8, the folding and configuring may be accomplished in accordance with a preferred embodiment as follows. A roll 200 of elongated strip material 202 having two flat surfaces and two lateral ends is provided. The strip material 202 is drawn from the roll 200 and fed through a plurality of crimpers 208. The crimped material is then fed through a folding mechanism 210 where one lateral end of the material 202 is folded over onto one flat surface and the other lateral end of the material is folded over onto the other flat surface. The folded material is then heated by, for example, a heating wheel 220 to form permanent folds.

A first adhesive applicator 222 applies adhesive to the folded material to adhere the one lateral end of the folded material to the one flat surface. The folded material is then rotated 180 degrees by a rotation wheel 224 or the like, and a second adhesive applicator 226 applies adhesive to the folded material to adhere the other lateral end to the other flat surface. The folded and configured material is then wound onto a supply roll 228 which can then be operably connected to the apparatus 10 described above. Any apparatus adapted to accomplish the above steps may be used with the invention. The apparatus may include a plurality of rollers 230 to facilitate the production of the laminate.

FIGS. 9–12 illustrate an alternative embodiment of an apparatus 310 for carrying out the invention, including an alternative embodiment of the stacking device 318. The stacking device 318 illustrated in FIGS. 9–12 includes the pair of blocks 412 extending substantially the same length as the stack 358. The stacking device 318 defines the first opening 416 for receiving the sheets of material and the second opening 418 for releasing portions of an expandable material 320 after a predetermined amount of stacked sheets is contained within the stacking device 318.

The stacking device 318 also includes a pair of inwardly-extending spacers 440 on the inwardly-facing walls 430 adjacent the first opening 416 for causing the opposed lateral edges of each individual sheet of strip material to fold or bend slightly upward as it is pressed onto the stack 358. A pair of guiding flanges 442 may also extend upward from the pair of inwardly-extending spacers 440, at a slight outward angle, for guiding the material into the stacking device 318. The press 316 is driven by the cam 398 which has an activating segment with a gradually increasing radius to move the press towards the stacking device 318.

The stacking device 318 of FIGS. 9–12 is similar to the stacking device 18 of FIGS. 1–8 except that the stacking device 318 does not include the pair of extendible arms. Instead, the blocks 412 of the stacking device are rigidly secured together in any suitable manner to prevent pivoting of the blocks 412. As a result, the apparatus 310 of FIGS. 9–12 operates in a manner similar to the apparatus 10 of FIGS. 1–8, except that the first opening 416 does not expand and contract and the press 316 does not travel two separate intervals of distance during the pressing step.

Although the invention has been described with reference to certain preferred embodiments, numerous modifications and variations can be made by those skilled in the art without departing from the novel spirit and scope of this invention.

What is claimed is:

1. An apparatus for producing a stack of expandable shade material comprising:
   (a) a frame;
   (b) a carriage adapted to move along at least a portion of the frame and draw individual sheets from a supply of strip material;
   (c) a stacking device for receiving and stacking the individual sheets of strip material on the stack;
   (d) an adhesive application device to apply adhesive to the stack as the next individual sheet to be applied to the stack from the supply of strip material is maintained in spaced relationship from the stack;
   (e) a press mounted on the frame for pressing onto the stack the individual sheets after the adhesive has been applied to the stack, the press adapted to reciprocate in directions generally perpendicular to the directions of reciprocation of the carriage; and
   (f) at least one cutting edge for cutting the individual sheets.

2. The apparatus of claim 1 wherein the supply of strip material includes first and second supplies which are alternately drawn from by the carriage.

3. The apparatus of claim 1 wherein the adhesive application device is mounted on the carriage and applies adhesive during movement of the carriage.

4. The apparatus of claim 1 further including a pair of mounting plates, the carriage adapted to reciprocate between the mounting plates.

5. The apparatus of claim 4 wherein there are two cutting edges, each cutting edge being slidably mounted to a respective mounting plate and adapted to slide in directions generally perpendicular to the directions of reciprocation of the carriage.

6. The apparatus of claim 5 wherein the press includes a pair of opposed longitudinal ends and a projection extends from each of the opposed ends, each projection adapted to contact a respective cutting edge causing the respective cutting edge to slide and cut a respective individual sheet.

7. An apparatus for producing a stack of expandable material comprising:
   (a) a frame;
   (b) a carriage adapted to reciprocate between a pair of mounting plates and adapted to move along at least a portion of the frame and draw individual sheets from a supply of strip material;
   (c) a stacking device for receiving and stacking the individual sheets of strip material on the stack;
   (d) an adhesive application device to apply adhesive to the stack;
   (e) a press mounted on the frame for pressing onto the stack the individual sheets, the press including a pair of opposed longitudinal ends and a projection extending from each of the opposed ends and adapted to reciprocate in directions generally perpendicular to the directions of reciprocation of the carriage; and
   (f) two cutting edges for cutting the individual sheets, each cutting edge being slidably mounted to a respective mounting plate and adapted to slide in directions generally perpendicular to the directions of reciprocation of the carriage, each projection on the press being adapted to contact a respective cutting edge causing the respective cutting edge to slide and cut a respective individual sheet, and the mounting plates being adapted to reciprocate along other respective portions of the frame such that each projection alternatively contacts the respective cutting edge.

8. The apparatus of claim 6 wherein the projections comprise stanchions adjustably mounted to the opposed ends.

9. The apparatus of claim 1 further including a first cam operably associated with the press for effecting reciprocation of the press.

10. An apparatus for producing a stack of expandable material comprising:
    (a) a frame;
    (b) a carriage adapted to move along at least a portion of the frame and draw individual sheets from a supply of strip material;
    (c) a stacking device for receiving and stacking the individual sheets of strip material on the stack;
    (d) an adhesive application device to apply adhesive to the stack;
    (e) a press mounted on the frame for pressing onto the stack the individual sheets and a first cam operatively associated with the press for effecting reciprocation of the press in directions generally perpendicular to the directions of reciprocation of the carriage, the stacking device being mounted to move alternately toward the press when the press is pressing the individual sheets and away from the press after pressing the individual sheets; and
    (f) at least one cutting edge for cutting the individual sheets.

11. An apparatus for producing a stack of expandable material comprising:
    (a) a frame;
    (b) a carriage adapted to move along at least a portion of the frame and draw individual sheets from a supply of strip material;
    (c) a stacking device for receiving and stacking the individual sheets of strip material on the stack;
    (d) an adhesive application device to apply adhesive to the stack;
    (e) a press mounted on the frame for pressing onto the stack the individual sheets, the press adapted to reciprocate in directions generally perpendicular to the directions of reciprocation of the carriage, the stacking device being mounted to move alternately toward the press when the press is pressing the individual sheets and away from the press after pressing the individual sheets;
    (f) a first cam operably associated with the press for effecting reciprocation of the press and a second cam operably associated with the stacking device for moving the stacking device toward and away from the press; and
    (g) at least one cutting edge for cutting the individual sheets.

12. The apparatus of claim 1 wherein the stacking device defines a first opening for receiving the individual sheets.

13. The apparatus of claim 12 wherein the stacking device includes a pair of opposed inwardly-extending spacers adjacent the first opening for bending opposed lateral edges of the individual sheets away from a stack of sheets contained within the stacking device.

14. An apparatus for producing a stack of expandable material comprising:
    (a) a frame;
    (b) a carriage adapted to move along at least a portion of the frame and draw individual sheets from a supply of strip material;
    (c) a stacking device defining a first opening for receiving and stacking the individual sheets of strip material on the stack, the first opening expanding when the press is pressing the individual sheets and contracting after the press presses the individual sheets;
    (d) an adhesive application device to apply adhesive to the stack;
    (e) a press mounted on the frame for pressing onto the stack the individual sheets, the press adapted to reciprocate in directions generally perpendicular to the directions of reciprocation of the carriage; and
    (f) at least one cutting edge for cutting the individual sheets.

15. An apparatus for producing a stack of expandable material comprising:
    (a) a frame;
    (b) a carriage adapted to move along at least a portion of the frame and draw individual sheets from a supply of strip material;

(c) a stacking device defining a first opening for receiving and stacking the individual sheets of strip material on the stack, the first opening expanding when the press is pressing the individual sheets and contracting after the press presses the individual sheets;

(d) an adhesive application device to apply adhesive to the stack;

(e) a press mounted on the frame for pressing onto the stack the individual sheets, the press adapted to reciprocate in directions generally perpendicular to the directions of reciprocation of the carriage, the press being mounted to move a first interval of distance in a direction toward a stack of sheets contained wherein the stacking device, and, after the first opening is expanded, to move a second interval of distance toward the stack; and (f) at least one cutting edge for cutting the individual sheets.

16. An apparatus for producing a stack of expandable material comprising:

(a) a frame;

(b) a carriage adapted to move along at least a portion of the frame and draw individual sheets from a supply of strip material;

(c) a stacking device defining a first opening for receiving and stacking the individual sheets of strip material on the stack, the first opening expanding when the press is pressing the individual sheets and contracting after the press presses the individual sheets;

(d) an adhesive application device to apply adhesive to the stack;

(e) a press mounted on the frame for pressing onto the stack the individual sheets, the press adapted to reciprocate in directions generally perpendicular to the directions of reciprocation of the carriage, the press being mounted to move a first interval of distance in a direction toward a stack of sheets contained within the stacking device, and, after the first opening is expanded, to move a second interval of distance toward the stack;

(f) a first cam operably associated with the press having a first radius to cause the press to move the first interval of distance and a second radius to cause the press to move the second interval of distance; and (g) at least one cutting edge for cutting the individual sheets.

17. An apparatus for producing a stack of expandable material comprising:

(a) a frame;

(b) a carriage adapted to move along at least a portion of the frame and draw individual sheets from a supply of strip material;

(c) a stacking device defining a first opening for receiving and stacking the individual sheets of strip material on the stack, the stacking device comprising a pair of blocks joined together by a pair of extendible arms to define the first opening;

(d) an adhesive application device to apply adhesive to the stack;

(e) a press mounted on the frame for pressing onto the stack the individual sheets, the press adapted to reciprocate in directions generally perpendicular to the directions of reciprocation of the carriage; and (f) at least one cutting edge for cutting the individual sheets.

18. The apparatus of claim 12 wherein the stacking device further defines a second opening for releasing from the stacking device a portion of a stack of sheets contained within the stacking device, the first and second openings being contiguous.

19. The apparatus of claim 18 wherein the stacking device defines at least one boss adjacent the second opening to prevent release of the portion of the stack until a predetermined number of the individual sheets is contained within the stacking, device.

20. The apparatus of claim 1 wherein the adhesive application device applies two strips of adhesive to the individual sheets.

21. The apparatus of claim 1 wherein the frame includes a beam extending generally parallel to the directions of travel of the reciprocating carriage, the carriage being slidably mounted to the beam.

22. The apparatus of claim 1 wherein the first and second supplies are supply rolls operably associated with the frame.

23. The apparatus of claim 1 wherein the carriage includes a first clamp adapted to alternately engage and disengage the strip material of the first supply and a second clamp adapted to alternately engage and disengage the strip material of the second supply.

24. An apparatus for producing a stack of expandable material comprising:

(a) a frame;

(b) a carriage adapted to move along at least a portion of the frame and including a first clamp adapted to alternately engage and disengage the individual sheets from a first supply of strip material and a second clamp adapted to alternately engage and disengage the individual sheets from a second supply of strip material;

(c) a switch operably associated with the first and second clamps, the switch being switchable form a first position wherein the first clamp is closed and the second clamp is open to a second position wherein the first clamp is open and the second clamp is closed;

(d) a stacking device for receiving and stacking the individual sheets of strip material on the stack;

(e) an adhesive application device to apply adhesive to the stack;

(f) a press mounted on the frame for pressing onto the stack the individual sheets, the press adapted to reciprocate in directions generally perpendicular to the directions of reciprocation of the carriage; and (g) at least one cutting edge for cutting the individual sheets.

25. An apparatus for producing a stack of expandable material comprising:

(a) a frame;

(b) a carriage adapted to move along at least a portion of the frame and including a first clamp adapted to alternately engage and disengage the individual sheets from a first supply of strip material and a second clamp adapted to alternately engage and disengage the individual sheets from a second supply of strip material;

(c) a switch operably associated with the first and second clamps, the switch being switchable form a first position wherein the first clamp is closed and the second clamp is open to a second position wherein the first clamp is open and the second clamp is closed, the carriage being adapted to reciprocate between a first actuator for switching the switch to the first position and a second actuator for switching the switch to the second position;

(d) a stacking device for receiving and stacking the individual sheets of strip material on the stack;

(e) an adhesive application device to apply adhesive to the stack;

(f) a press mounted on the frame for pressing onto the stack the individual sheets, the press adapted to reciprocate in directions generally perpendicular to the directions of reciprocation of the carriage; and (g) at least one cutting edge for cutting the individual sheets.

26. An apparatus for producing a stack of expandable shade material comprising:

(a) means for engaging a supply of strip material;

(b) means for drawing individual sheets from the supply of strip material;

(c) means for receiving and stacking the individual sheets of strip material on the stack;

(d) means for applying adhesive to the stack as the next individual sheet to be applied to the stack from the supply of strip material is maintained in spaced relationship from the stack;

(e) means for pressing the individual sheets onto the stack after the adhesive has been applied to the stack; and (f) means for cutting the individual sheets.

* * * * *